United States Patent
Yuksel

(10) Patent No.: US 9,344,847 B2
(45) Date of Patent: May 17, 2016

(54) LOCATION BASED NOTIFICATION SYSTEM

(71) Applicant: Turkcell Teknoloji Araş tirma ve Geli ş tirme Anonim Sirketi, Kocaeli (TR)

(72) Inventor: Ali Yuksel, Kocaeli (TR)

(73) Assignee: TURKCELL TEKNOLOJI ARASTIRMA VE GELISTIRME ANONIM SIRKETI, Gebze Kocaeli (TR)

( * ) Notice: Subject to any disclaimer, the term of this patent is extended or adjusted under 35 U.S.C. 154(b) by 0 days.

(21) Appl. No.: 14/760,875

(22) PCT Filed: Mar. 12, 2013

(86) PCT No.: PCT/IB2013/051934
§ 371 (c)(1),
(2) Date: Jul. 14, 2015

(87) PCT Pub. No.: WO2014/108764
PCT Pub. Date: Jul. 17, 2014

(65) Prior Publication Data
US 2015/0358779 A1    Dec. 10, 2015

(30) Foreign Application Priority Data

Jan. 14, 2013 (TR) .............................. a 2013 00456

(51) Int. Cl.
| | |
|---|---|
| H04W 4/02 | (2009.01) |
| H04W 68/00 | (2009.01) |
| H04W 64/00 | (2009.01) |
| H04W 4/14 | (2009.01) |
| H04M 1/725 | (2006.01) |
| G01S 1/72 | (2006.01) |
| H04W 4/20 | (2009.01) |
| G06Q 30/02 | (2012.01) |
| H04W 4/04 | (2009.01) |

(52) U.S. Cl.
CPC .............. *H04W 4/023* (2013.01); *G01S 1/725* (2013.01); *G06Q 30/0261* (2013.01); *H04M 1/72572* (2013.01); *H04W 4/021* (2013.01); *H04W 4/14* (2013.01); *H04W 4/206* (2013.01); *H04W 64/003* (2013.01); *H04W 68/005* (2013.01); *H04W 4/043* (2013.01)

(58) Field of Classification Search
CPC ....... H04W 4/02; H04W 4/021; H04W 64/00; H04W 64/003; H04W 4/023; G06Q 30/0205
See application file for complete search history.

(56) References Cited

U.S. PATENT DOCUMENTS

| | | | |
|---|---|---|---|
| 8,138,919 B2 | 3/2012 | Christopher | |
| 8,660,581 B2 * | 2/2014 | Davis ................... | H04W 4/023 367/118 |
| 2008/0074264 A1 | 3/2008 | Sharpe et al. | |
| 2011/0028160 A1 | 2/2011 | Roeding et al. | |

* cited by examiner

*Primary Examiner* — Curtis Odom
(74) *Attorney, Agent, or Firm* — Ladas & Parry LLP

(57) ABSTRACT

The present invention relates to a system which enables to determine locations of subscribers in indoor and/or small outdoor areas by means of mobile devices and to make notifications specific for subscribers over mobile device according to this location information determined. The inventive system comprises mobile device, receiver, detection unit, sound emission apparatus, wide area location monitoring unit, database, small area location monitoring unit, database and notification platform.

27 Claims, 1 Drawing Sheet

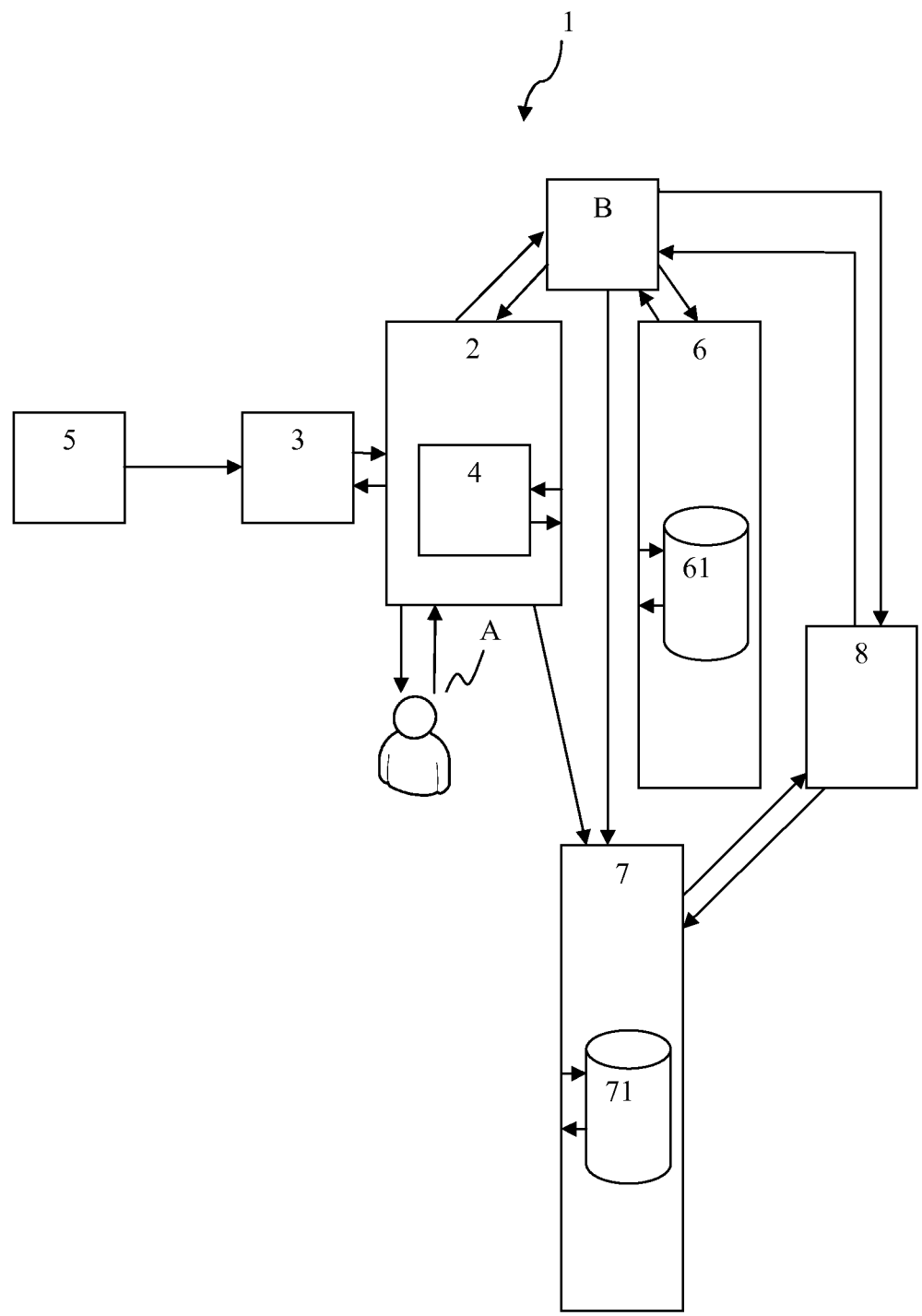

LOCATION BASED NOTIFICATION SYSTEM

RELATED APPLICATION INFORMATION

This application is a 371 of International Application PCT/IB2013/051934 filed 12 Mar. 2013, which claims priority from TR Application No. 2013/00446 filed 14 Jan. 2013, the disclosures of which are incorporated in their entirety by reference herein.

TECHNICAL FIELD

The present invention relates to a system which enables to determine locations of subscribers in indoor and/or small outdoor areas by means of mobile devices and to make notifications specific for subscribers over mobile device according to this location information determined.

BACKGROUND OF THE INVENTION

Today, use of mobile devices and mobile services shows continuous increase. Association of this use showing continuous increase to other activities of subscribers is of vital importance for GSM (Global System for Mobile Communications) operators.

One of the most common ways to make activities of subscribers, who use mobile device and mobile services, in daily life interactive with this device and services is to follow locations of subscribers and inform the subscriber of products, services or campaigns which may serve them in this location, over his/her mobile device. Carrying out the said transaction in the most efficient way is possible through determination of the subscriber's location in the most accurate way possible.

In the state of the art, location of a subscriber is determined according to GPS (Global Positioning System) signal or signal received from base stations. However, in this type of determination, the location where the subscriber is present is determined within a wide area, the point where the subscriber is present in a building cannot be detected and these determinations cannot provide a high degree of precision. Also, this type of determination does not enable to make detection, registration, research on the basis of points of interest.

In the state of the art, there is no system or method which will be enable to work in indoor or small outdoor areas rather than wide areas and to determine exact location of a subscriber in a building or a small outdoor area by performing sound broadcasting having different ID information from certain points and detecting these broadcasts by the mobile device.

The United States patent document no. US2008/0074264, an application in the state of the art, discloses a system and method which enables to provide product information according to location of in-store customer.

The United States patent document no. U.S. Pat. No. 8,138,919, another application in the state of the art, discloses a system and method which provides location based communication.

SUMMARY OF THE INVENTION

An objective of the present invention is to realize a system which enables to determine locations of subscribers in indoor and/or small outdoor areas by means of mobile devices.

Another objective of the present invention is to realize a system which enables to make notifications specific for subscribers over mobile device according to this location information.

DESCRIPTION OF THE INVENTION

"A Location Based Notification System" realized to fulfil the objectives of the present invention is shown in the FIGURE attached, in which:

FIG. 1 is a schematic block diagram of the inventive system.

The components illustrated in the FIGURE are individually numbered, where the numbers refer to the following:
1. System
2. Mobile device
3. Receiver
4. Detection unit
5. Sound emission apparatus
6. Wide area location monitoring unit
   61. Database
7. Small area location monitoring unit
   71. Database
8. Notification platform
A. Subscriber
B. Remote communication network A system (1) providing location based notifications comprises:
- at least one mobile device (2) whereby notifications specific for a subscriber (A) can be transmitted to that subscriber (A) and which serves the purpose of determining the location where the subscriber (A) is present;
- at least one receiver (3) which enables the ambient sound to be listened by the mobile device (2);
- at least one detection unit (4) which operates on the mobile device (2) and essentially enables the sound received by means of the receiver (3) to be examined and defined, can be powered on/off remotely;
- at least one sound emission apparatus (5) which has a certain ID information and can transmit this ID information owned by it through the sound broadcasting that it performs;
- at least one wide area location monitoring unit (6) which can power on and power off the detection unit (4) remotely according to status of match between the coverage area where the subscriber (A) is present and the area where the sound emission apparatus (5) is installed by determining the mobile device (2) location through the device's (2) use of the remote communication network (B);
- at least one database (61) which is included within the wide area location monitoring unit (6) and keeps the location information about the indoor areas where the sound emission apparatuses (5) are installed;
- at least one small area location monitoring unit (7) which tracks power on/off states of the detection unit (4), enables related components to reach these information by receiving and recording the information received from this unit (4);
- at least one database (71) which is included within the small area location monitoring unit (7) and keeps the ID information and the location information of the sound emission apparatus (5) and the information received by the small area location monitoring unit (7) from the detection unit (4) paired with subscriber (S) data;
- at least one notification platform (8) which receives the information recorded on the database (71) by the small area location monitoring unit (7) and sends notifications such as content, campaign, offer to the related subscriber (A) for these records over the remote communication network (B) and receives answer of the subscriber (A) over the remote communication network (B) in cases where answer can be received from the subscriber (A) by means of the mobile device (2) (FIG. 1)

The mobile device (2) is a unit whereby notifications specific for a subscriber (A) can be transmitted to that subscriber (A) and which serves the purpose of determining the location where the subscriber (A) is present. In different embodiments of the invention, the mobile device (2) can be a mobile phone, a smart phone or a tablet computer.

The receiver (3) is a unit which enables the ambient sound to be listened by the mobile device (2). In a preferred embodiment of the invention, the receiver (3) is a microphone that is integrated or can be inserted to the mobile device (2) later.

The detection unit (4) is a unit which operates on the mobile device (2) and essentially enables the sound received by means of the receiver (3) to be examined and defined, can be powered on/off remotely. In a preferred embodiment of the invention, the detection unit (4) listens to only sounds in a certain frequency and detects ID information in these sounds. The detection unit (4) also transfers identificatory information belonging to the subscriber (A) together with this ID information, to the small area location monitoring unit (7). In a preferred embodiment of the invention, the identificatory information belonging to the subscriber (A) may be MSISDN (Mobile Station International Subscriber Directory Number) information belonging to the mobile device (2) on which the detection unit (4) operates. In different embodiments of the invention, the identificatory information belonging to the subscriber (A) may be any user name, membership no, etc. which enables the subscriber (A) to be recognized by the small area location monitoring unit (7).

The detection unit (4) has a structure such that it can be powered on by the wide area location monitoring unit (6) automatically when the subscriber (A) enters a wide area, which comprises a small area where the sound emission apparatus (5) is installed, with his/her mobile device (2) and this is understood by the wide area location monitoring unit (6). Also, the detection unit (4) has a structure such that it can be powered off by the wide area location monitoring unit (6) automatically when the subscriber (A) exits the wide area, which comprises the said small area, with his/her mobile device (2). In addition to these situations, the detection unit (4) can be powered on/off by the subscriber (A) at any time in different embodiments of the invention. In each situation where the detection unit (4) is powered off, it can still send the information that it is powered off to the small area location monitoring unit (7) together with an information (for example, together with the MSISDN information belonging to the mobile device (2)) defining the subscriber (A).

In a preferred embodiment of the invention, the detection unit (4) has a structure such that it can perform listening periodically and when the ID information within the sound that it listened to is different than a previous one, it can transfer this ID information to the small area location monitoring unit (7) together with an information defining the subscriber (A) again.

The detection unit (4) performs information transfers to the small area location monitoring unit (7) over http (Hyper-Text Transfer Protocol).

The sound emission apparatus (5) is a unit which has certain ID information and can transmit this ID information owned by it through the sound broadcasting that it performs.

In a preferred embodiment of the invention, the sound emission apparatus (5) is a unit which performs sound broadcasting in a way such that human ear cannot hear. In an embodiment of the invention, the sound emission apparatus (5) can be a standard audio system. Intensity and frequency of the sound emitted by the sound emission apparatus (5) can be regulated. Thus, by sound configurations to be applied, it can be ensured that sound can be emitted such that it will not exceed a certain area through.

The wide area location monitoring unit (6) is a unit which can power on and power off the detection unit (4) remotely according to status of match between the coverage area where the subscriber (A) is present and the area where the sound emission apparatus (5) is installed by determining the mobile device (2) location through the device's (2) use of the remote communication network (B). In a preferred embodiment of the invention, the wide area location monitoring unit (6) is within a GSM (Global System for Mobile Communications) operator and it determines the location of the subscriber (A) roughly such that it will be within the coverage area of the base station where the subscriber (A) gets service from, upon the subscriber (A) uses his/her mobile device (2) on a GSM network which is a remote communication network (B). In a different embodiment of the invention, the wide area location monitoring unit (6) can still determine the location of the subscriber (A) roughly by the help of wireless Internet network used by the subscriber (A) over his/her mobile device (2).

The database (61) is a unit which is included within the wide area location monitoring unit (6) and keeps the location information about the indoor areas where the sound emission apparatuses (5) are installed. The wide area location monitoring unit (6) uses the information in this database (61) in order to carry out transaction of powering on/off the detection unit (4) remotely. The wide area location monitoring unit (6) powers on the detection unit (4) remotely if the wide area where the subscriber (A) is present matches with the area where the sound emission apparatus (5) is installed according to the information in this database (61). If the subscriber (A) exits this area and the wide area just entered is an area where no sound emission apparatus (5) is installed, the detection unit (4) is powered off by the wide area location monitoring unit (6). Transaction for powering on/off the detection unit (4) remotely is carried out by means of a message which is sent to the mobile device (2) by the wide area location monitoring unit (6) and which can be understood by the detection unit (4).

The small area location monitoring unit (7) is a unit which tracks power on/off states of the detection unit (4) and enables related components to reach this information by receiving and recording the information received from this unit (4). Due to the fact that the small area location monitoring unit (7) is a unit which receives the ID information obtained from the sound emission apparatus (5) by the detection unit (4), it can determine location of the subscriber (A) as a point in indoor areas or a point in an outdoor area. For example, even if the location of the subscriber (A) is determined as in a building/outdoor selling area or coverage area of the base station providing service to that building/outdoor selling area with the wide area location monitoring unit (6) no information can be obtained about where the subscriber (A) is present in that building/outdoor selling area exactly. However; information about in which store the subscriber (A) is present in a building, in which section of that store the subscriber (A) is present or information that s/he is in an outdoor selling area, for example in front of which sales stand s/he is present, can be obtained with the small area location monitoring unit (7).

The small area location monitoring unit (7) deletes the record belonging to the mobile device (2) on which the detection unit (4) operates, from the database (71) in the event that the detection unit (4) is powered off. Thus, it's determining the location of the subscriber (A) incorrectly is avoided.

The small area location monitoring unit (7) is a unit which enables the notification platform (8) to access the information kept in the database (71) and to make notifications specific for that subscriber (A) to the subscriber (A).

The small area location monitoring unit (7) converts the ID information of the sound emission apparatus (5) into location information using the information in the database (71) when it receives ID information of a sound emission apparatus (5) and a subscriber (A) definition information from the detection unit (4). In addition, this unit (7) records this location information obtained by it to the database (71) with the subscriber (A) definition information conjugately.

The database (71) is a unit which is included within the small area location monitoring unit (7) and keeps the ID information and the location information of the sound emission apparatus (5) and the information received by the small area location monitoring unit (7) from the detection unit (4) paired with subscriber (S) data.

The notification platform (8) is a unit which receives the information recorded on the database (71) by the small area location monitoring unit (7) and sends notifications such as content, campaign, offer to the related subscriber (A) for these records over the remote communication network (B) and receives answer of the subscriber (A) over the remote communication network (B) in cases where answer can be received from the subscriber (A) by means of the mobile device (2). The notification platform (8) determines a suitable notification using the subscriber (A) preferences and the location information kept paired with the subscriber (A) identification information during the notification transaction and transmits this notification to the mobile device (2) of the subscriber (A).

In an embodiment of the invention, the notifications transmitted to the mobile device (2) by the notification platform (8) are sent as short message (SMS—Short Message Service). In a different embodiment of the invention, notifications are sent to the mobile device (2) as push notification messages that are sent to the detection unit (4) operating on the mobile device (2). In a different embodiment of the invention, the notification platform (8) transmits notification messages as "WAP (Wireless Application Protocol) push messages. In each case, the potential answer of the subscriber (A) is received from the subscriber (A) through the method whereby notification is sent to the subscriber (A) and arrives the notification platform (8).

With the inventive system (1), transaction of determining locations of subscribers (A) in indoor and/or small areas by means of mobile devices (2) is carried out. While the said transactions are being carried out, the mobile device (2) belonging to the subscriber (A) entering the wide area wherein a small area, in which a sound emission apparatus (5) is installed, is present is recognized by means of the information in the database (61) by the wide area location monitoring unit (6) and the detection unit (4) operating on the mobile device (2) is activated remotely. The detection unit (4) determines the ID information of the sound emission apparatus (5) which emits the sounds received by means of the receiver (3) and transfers this information to the small area location monitoring unit (7). And the small area location monitoring unit (7) converts this ID information into location information by means of the information in the database (71) and records the location information obtained to the database (71) such that it will be matched with the subscriber (A) identification information.

Also, transaction of sending notifications specific for subscribers (A) is carried out over the mobile device (2) according to the location information by means of the inventive system (1). While the said transaction is being carried out, the notification platform (8) accesses the database (71) kept within the small area location monitoring unit (7) and subscribers (A) present in locations suitable about making notification are detected. Notification messages such as campaign, offer specific for the subscriber (A) data, the subscriber (A) preferences and the location are sent to these subscribers (A) detected by means of the remote communication network (B).

To mention an exemplary embodiment of the inventive system (1), transaction of sending campaign and offer notifications to a subscriber (A) who enters a store where the sound emission apparatus (5) is installed in a shopping centre about products being sold at that store and in some cases, receiving the answer of the subscriber (A) about whether to make use of a campaign opportunity or not can be considered. In the said example, when the subscriber (A) approaches a shopping centre the wide area location monitoring unit (6) will realize that the subscriber (A) enters the coverage area where the shopping centre is included comprising at least one store where the sound emission apparatus (5) is installed and power on the detection unit (4) remotely on the mobile device (2). After this transaction, the detection unit (4) will perform periodical listening and when the subscriber (A) reaches, for example, a shoe store where the sound emission apparatus (5) is installed it will transmit this situation to the small area location monitoring unit (7). Because the small area location monitoring unit (7) knows the ID information of the sound emission apparatus (5) installed in the shoe store, it will understand that the subscriber (A) is in that store and record this situation. And the notification platform (8) will be able to send notifications such as campaign, offer specific for the subscriber (A) using this information. If the subscriber (A) moves away from the shoe store and enters, for example, a restaurant in the same shopping centre where the sound emission apparatus (5) is installed the detection unit (4) realizes the change of ID information in the sound emission apparatus (5) and it will inform the small area location monitoring unit (7) about this matter. Because the small area location monitoring unit (7) knows the ID information of the sound emission apparatus (5) installed in the restaurant, it will understand that the subscriber (A) is now in the restaurant and record this status. And the notification platform (8) will transmit a notification specific for the subscriber (A), for example information of discount menu of the day at that restaurant, using this new information. Whereas when the subscriber (A) exits a shopping centre or enters a coverage area comprising an area where no sound emission apparatus (5) is installed, the detection unit (4) will be powered off by the wide area location monitoring unit (6) automatically. After the detection unit (4) transfers the power off status to the small area location monitoring unit (7), the small area location monitoring unit (7) will delete the record that the subscriber (A) is in the restaurant from the database (71).

A similar use case of the inventive system (1) is not only valid in indoor areas and/or with respect to a whole store it is also valid at points such as selling/promotion areas and/or stands where the sound emission apparatus (5) is installed.

It is possible to develop various embodiments of the inventive "system (1)", it cannot be limited to examples disclosed herein and it is essentially according to claims.

The invention claimed is:

1. A system which provides location based notifications comprising:
    at least one mobile device whereby notifications specific for a subscriber can be transmitted to that subscriber and which serves the purpose of determining the location where the subscriber is present;
    at least one receiver which enables ambient sound to be listened to by the mobile device;
    at least one detection unit;
    at least one sound emission apparatus which has a certain ID information and transmits this ID information owned by itself through a sound broadcasting that it performs;
    at least one wide area location monitoring unit;
    at least one database which is included within the wide area location monitoring unit and keeps the location information about the indoor areas where the sound emission apparatuses are installed;
    at least one small area location monitoring unit;
    at least one database which is included within the small area location monitoring unit and keeps the ID information and the location information of the sound emission apparatus and the information received by the small area location monitoring unit from the detection unit paired with subscriber data;
    at least one notification platform which receives the information recorded on the database by the small area location monitoring unit and sends notifications such as content, campaign, or offers related to the subscriber for these records over a remote communication network and receives an answer of the subscriber over the remote communication network in cases where an answer can be received from the subscriber by means of the mobile device
    wherein
    at least one detection unit which operates on the mobile device and essentially enables the sound received by means of the receiver to be examined and defined, can be powered on/off remotely;
    at least one wide area location monitoring unit which can power on and power off the detection unit remotely according to status of match between the coverage area where the subscriber is present and the area where the sound emission apparatus is installed by determining the mobile device location through the device's use of the remote communication network; and
    at least one small area location monitoring unit which tracks power on/off states of the detection unit, enables related components to reach these information by receiving and recording the information received from this unit.

2. A system according to claim 1, wherein the mobile device is a mobile phone.

3. A system according to claim 1, wherein the mobile device is a smart phone.

4. A system according to claim 1, wherein the mobile device (2) is a tablet computer.

5. A system according to claim 1, wherein the receiver (3) is a microphone that is integrated or can be inserted to the mobile device later.

6. A system according to claim 1, wherein at least one detection unit listens to only sounds in a certain frequency and detects ID information in these sounds.

7. A system (1) according to claim 1, wherein at least one detection unit also transfers an identificatory information belonging to the subscriber together with the ID information of the sound emission apparatus, to the small area location monitoring unit.

8. A system according to claim 1, wherein the detection unit transfers MSISDN (Mobile Station International Subscriber Directory Number) information belonging to the mobile device on which the detection unit operates, to the small area location monitoring unit as identificatory information belonging to the subscriber.

9. A system (1) according to claim 1, wherein the detection unit transfers information of any user name, membership for enabling the subscriber to be recognized by the small area location monitoring unit to the small area location monitoring unit as identificatory information belonging to the subscriber.

10. A system according to claim 1, wherein the detection unit has a structure such that it can be powered off by the wide area location monitoring unit automatically when the subscriber exits the wide area, that comprises the small area where the sound emission apparatus is installed, with the mobile device.

11. A system according to claim 1, wherein the detection unit can be powered on/off by the subscriber at any time.

12. A system according to claim 1, wherein the detection unit sends the information that it is powered off to the small area location monitoring unit together with an information defining the subscriber in each case where it is powered off.

13. A system according to claim 1, wherein the detection unit has a structure such that it can perform listening periodically and when the ID information within the sound that it listened to is different from a previous one, it can transfer this ID information to the small area location monitoring unit together with an information defining the subscriber again.

14. A system according to claim 1, wherein a detection unit performs information transfers to the small area location monitoring unit over http (Hyper-Text Transfer Protocol).

15. A system according to claim 1, wherein the sound emission apparatus which performs sound broadcasting in such a way that the sound cannot be heard by a human ear.

16. A system according to claim 1, wherein the sound emission apparatus is a standard audio system.

17. A system according to claim 1, wherein the sound emission apparatus performs sound broadcasting in a way such that its intensity and frequency can be are configurable.

18. A system (1) according to claim 1, including a wide area location monitoring unit which is within a GSM (Global System for Mobile Communications) operator and determines the location of the subscriber roughly such that it will be within the coverage area of the base station where the subscriber gets service from, upon the subscriber uses the mobile device on a GSM network that is a remote communication network.

19. A system according to claim 1, wherein the wide area location monitoring unit powers on the detection unit remotely if the wide area where the subscriber is present matches with an area where the sound emission apparatus is installed according to the information in the database.

20. A system according to claim 1, including a wide area location monitoring unit which powers off the detection unit if the wide area where the subscriber enters is an area where no sound emission apparatus is installed.

21. A system according to claim 1, wherein the wide area location monitoring unit carries out the transaction for powering on/off the detection unit remotely by means of a message that is sent to the mobile device and can be understood by the detection unit.

22. A system according to claim 1, including a small area location monitoring unit which determines location of the subscriber as a point in indoor areas or a point in an outdoor area.

23. A system according to claim 1, wherein the small area location monitoring unit deletes the record belonging to the mobile device on which the detection unit operates from the database in the event that the detection unit is powered off.

24. A system according to claim 1, wherein the small area location monitoring unit converts the ID information of the sound emission apparatus into location information using the information in the database when it receives ID information of a sound emission apparatus and a subscriber definition information from the detection unit.

25. A system according to claim 1, wherein the notification platform determines a suitable notification using the subscriber preferences and the location information kept paired with the subscriber identification information during the notification transaction.

26. A system according to claim 1, wherein the notification platform sends notifications to the mobile device as short messages.

27. A system according to claim 1, wherein the notification platform sends the notifications to the mobile device as push notification messages that are sent to the detection unit operating on the mobile device.

* * * * *